(12) United States Patent
Wesling

(10) Patent No.: US 11,703,118 B2
(45) Date of Patent: Jul. 18, 2023

(54) CONTROL DEVICE FOR BICYCLE AND METHODS

(71) Applicant: SRAM, LLC, Chicago, IL (US)

(72) Inventor: Kevin Wesling, Lombard, IL (US)

(73) Assignee: SRAM, LLC, Chicago, IL (US)

( * ) Notice: Subject to any disclaimer, the term of this patent is extended or adjusted under 35 U.S.C. 154(b) by 146 days.

(21) Appl. No.: 17/220,478

(22) Filed: Apr. 1, 2021

(65) Prior Publication Data

US 2021/0222770 A1  Jul. 22, 2021

Related U.S. Application Data

(63) Continuation of application No. 13/750,648, filed on Jan. 25, 2013, now Pat. No. 10,982,751.

(51) Int. Cl.
| | |
|---|---|
| *F16H 59/02* | (2006.01) |
| *B62K 23/02* | (2006.01) |
| *B62M 25/04* | (2006.01) |
| *B62M 9/122* | (2010.01) |
| *B62M 25/08* | (2006.01) |
| *B62J 45/414* | (2020.01) |
| *G06F 3/01* | (2006.01) |
| *F16H 59/68* | (2006.01) |
| *G06F 1/16* | (2006.01) |

(52) U.S. Cl.
CPC ............ *F16H 59/02* (2013.01); *B62J 45/414* (2020.02); *B62K 23/02* (2013.01); *B62M 25/045* (2013.01); *G06F 3/014* (2013.01); *F16H 59/68* (2013.01); *G06F 1/163* (2013.01)

(58) Field of Classification Search
CPC ..... F16H 59/02; B62M 25/045; B62J 45/414; B62K 23/02
See application file for complete search history.

(56) References Cited

U.S. PATENT DOCUMENTS

| | | |
|---|---|---|
| 5,356,348 A | 10/1994 | Bellio et al. |
| 2005/0227798 A1 | 10/2005 | Ichida et al. |
| 2008/0290616 A1 | 11/2008 | Burgess, Jr. |
| 2009/0102628 A1 | 4/2009 | Takebayashi |
| 2009/0212979 A1 | 8/2009 | Catchings et al. |
| 2010/0198453 A1 | 8/2010 | Dorogusker et al. |
| 2011/0219911 A1 | 9/2011 | Zoumaras et al. |
| 2011/0285619 A1 | 11/2011 | Schifferdecker et al. |
| 2012/0130591 A1 | 5/2012 | Song et al. |
| 2012/0139336 A1 | 6/2012 | Ledford et al. |

(Continued)

FOREIGN PATENT DOCUMENTS

| | | |
|---|---|---|
| DE | 10252557 A1 | 5/2004 |
| DE | 202006004922 | 8/2006 |

(Continued)

*Primary Examiner* — Tinh Dang

(57) ABSTRACT

A control device wearable by a bicycle rider, the control device including at least one control sensor generating input signals when actuated. A control processor is connected to the at least one control sensor generating control signals responsive to the input signals. A wireless transmitter is in communication with the processor transmitting the control signals and a power source is connected to the shift control processor and the wireless transmitter. The control device may one or more of a control gear changer, one or more suspension component, and other electronically-controllable components or systems.

20 Claims, 12 Drawing Sheets

(56) References Cited

U.S. PATENT DOCUMENTS

| | | | |
|---|---|---|---|
| 2012/0221205 A1 | 8/2012 | Ichida et al. | |
| 2012/0266358 A1* | 10/2012 | Yuen | A61B 5/7475 463/37 |
| 2013/0027307 A1 | 1/2013 | Chen et al. | |
| 2013/0081891 A1 | 4/2013 | Ulmen et al. | |
| 2013/0107500 A1 | 5/2013 | Noble et al. | |
| 2013/0169420 A1* | 7/2013 | Blount, Jr. | G06F 3/014 340/12.5 |

FOREIGN PATENT DOCUMENTS

| | | |
|---|---|---|
| DE | 602005001339 T2 | 2/2008 |
| WO | 9117078 | 11/1991 |
| WO | 2003012615 | 2/2003 |
| WO | 2003012615 A2 | 2/2003 |
| WO | 2007070508 | 6/2007 |
| WO | 2011020219 | 2/2011 |
| WO | 2011083442 | 7/2011 |
| WO | 2012054443 | 4/2012 |

\* cited by examiner

CONTROL DEVICE FOR BICYCLE AND METHODS

This application is a continuation of U.S. patent application Ser. No. 13/750,648, filed Jan. 25, 2013, the contents of which are herein incorporated in their entirety.

BACKGROUND OF THE INVENTION

The invention relates to bicycle control systems. In particular, the invention is directed to systems including wirelessly enabled controllers for bicycle gear changers and/or bicycle suspensions and other bicycle components and systems.

Electronic devices and wireless communication are common in modern society. Operating such devices during activities which require concentration and control such as riding a bike can be hazardous. This is because the user input for the control is traditionally mounted to the handlebar of a bike. In some instances, in well-designed controllers, the rider's hands are close to the control switches so activating the control switches poses little danger. However, in the case where the rider has their hands in a location remote from the control switches, the rider must then shift one hand to the control switch and temporarily control the bike with the remaining hand. Additionally, should the rider wish to operate the control switch while braking, the rider would have to remove their hand from the brake lever and temporarily interrupt braking in order to activate the control switch.

There exists a need to provide control of remotely operated electronic devices of a bicycle while allowing the rider to maintain contact with the bar and a visual line of sight with the road ahead. The present invention provides a means of wireless control of multiple devices without the rider changing hand positions on the handlebar.

The prior art controllers typically mount to the handlebar of the bicycle. In U.S. Published Application No. 2008/0168856, shift buttons are shown integrated with the brake lever assembly and shift buttons are mounted directly to the bar. This requires structure to mount the shifter to the bar which increases weight. Attaching the shifter to the bar requires the user to reach for that particular position to activate a shift. If alternative positions are desired, additional discrete shifters must be attached to the bar. The shifters may all be linked by cables or wires which adds complexity and weight. Alternatively, they may all be discretely wireless, which requires separate power sources for each device adding weight and complexity.

SUMMARY OF THE INVENTION

According to embodiments of the invention, control devices, which maybe shift control devices, may be carried by/mounted to the user and thus follow the user to alternative hand positions. A single power source is required if all the shifting is done with one hand, and only two if both hands are used. The shift control devices are easily transportable from bike to bike and only one set is necessary. Additionally, the shift control devices do not need to be removed from the bar to recharge because they are not attached to the bar.

Aspects of the invention contemplate a bicycle shifting system where the front derailleur and the rear derailleur are controlled wirelessly by means of a wireless shift control device or devices located not on the handlebar but on the rider. In one embodiment, the rider wears the shift control devices on his/her hands and makes a shift through a specific movement of the finger or fingers of that hand. Such movements or actuations should not be encountered in the normal course of riding a bicycle so as to avoid unintentional shifting.

Some examples of these movements include:
1. Flicking of the index finger;
2. Touching the thumb and any of the other fingers together, perhaps with some threshold force;
3. Hyper-extension of any of the 5 digits beyond the normal operating range;
4. Compression of the tips of the fingers rather than the pads; and
5. Any combinations of the above actions.

Alternatively, the invention contemplates a system with control devices for the control of suspension components or systems, or other wirelessly controllable components or systems of the bicycle.

The invention also benefits from single-button shifting. In single-button shifting, each hand requires one actuator, button, switch or the like connected to the shift control device. For example, a right-hand actuator would cause a shift of the rear derailleur in one direction, a left-hand actuator would cause a shift of the rear derailleur in the other direction and activating both actuators simultaneously would toggle the front derailleur to the other of its current inboard or outboard position.

The invention includes a means to shift the front and rear derailleurs of a bicycle from the hands of the rider rather than from the bar of the bike. In this way the user input to control the shift follows the hands and regardless of where they are disposed.

One aspect of the invention is a control device wearable by a bicycle rider, the control device including at least one wearable shift control sensor generating input signals when actuated. A control processor is provided in communication with the at least one shift control sensor generating control signals responsive to the input signals. A wireless transmitter is responsive to the processor for transmitting the control signals. A power source is connected to the control processor and the wireless transmitter.

Another aspect of the invention is a shifting system for a bicycle, including a shift control device. The shift control device includes at least one wearable shift control sensor to generate input signals when actuated, a shift control processor in communication with the at least one shift control sensor generating control signals responsive to the input signals, a wireless transmitter transmitting the control signals, and a power source connected to the shift control processor and the wireless transmitter. The system includes an electromechanical rear derailleur including a rear derailleur wireless receiver receiving the control signals, a rear derailleur motor responsive to the received control signals, and a rear derailleur power source connected to the rear derailleur wireless receiver and the rear derailleur motor.

DETAILED DESCRIPTION OF THE INVENTION

Embodiments of the invention will herein be described with reference to the drawings. It will be understood that the drawings and descriptions set out herein are provided for illustration only and do not limit the invention as defined by the claims appended hereto and any and all their equivalents. For example, the terms "first" and "second," "front" and "rear," or "left" and "right" are used for the sake of clarity and not as terms of limitation. Moreover, the terms refer to bicycle mechanisms conventionally mounted to a bicycle and with the bicycle oriented and used in a standard fashion unless otherwise indicated.

Figure 1:
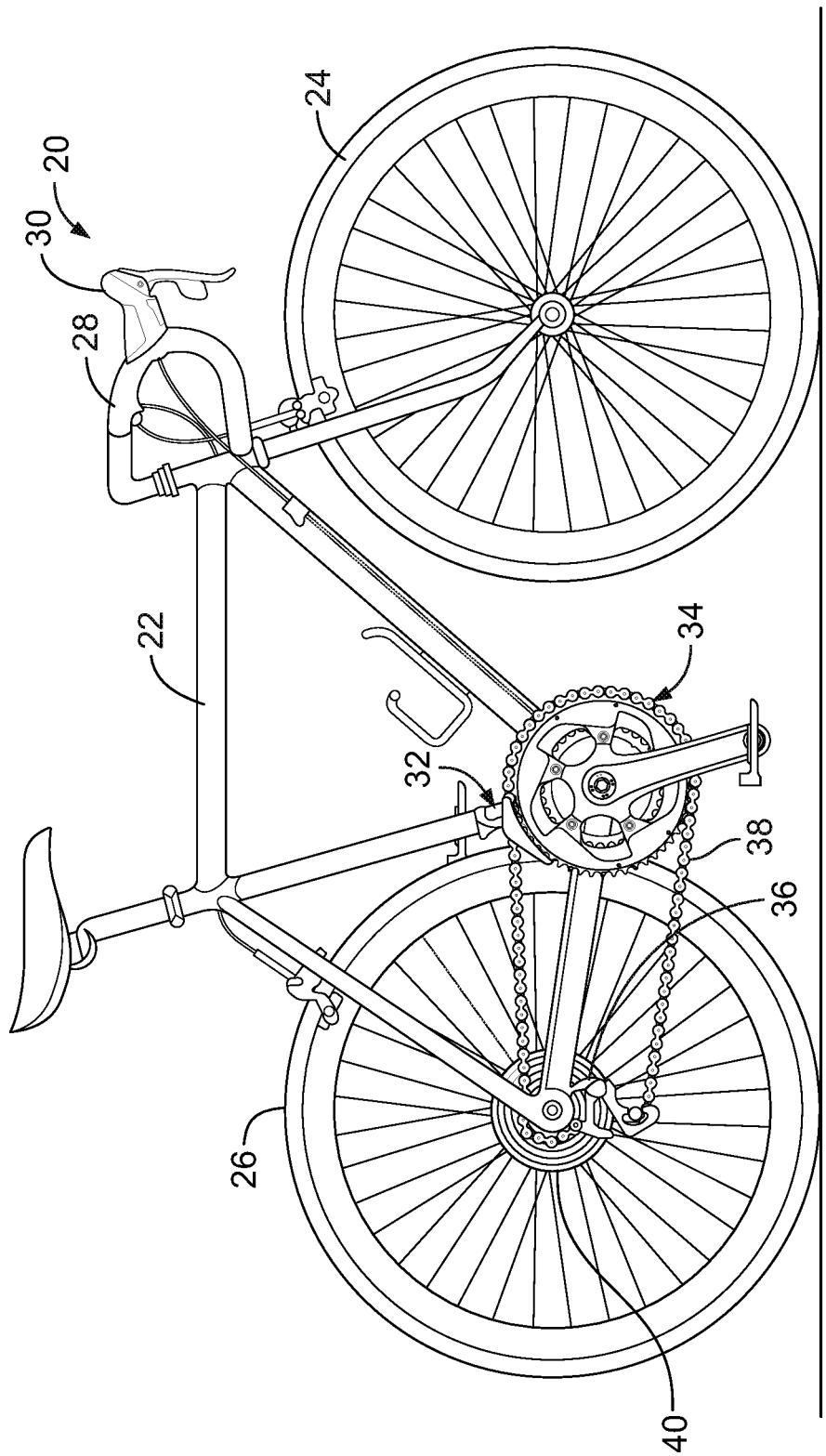
FIG. 1 is a bicycle with derailleurs and brake levers installed thereon.
Figure 16:
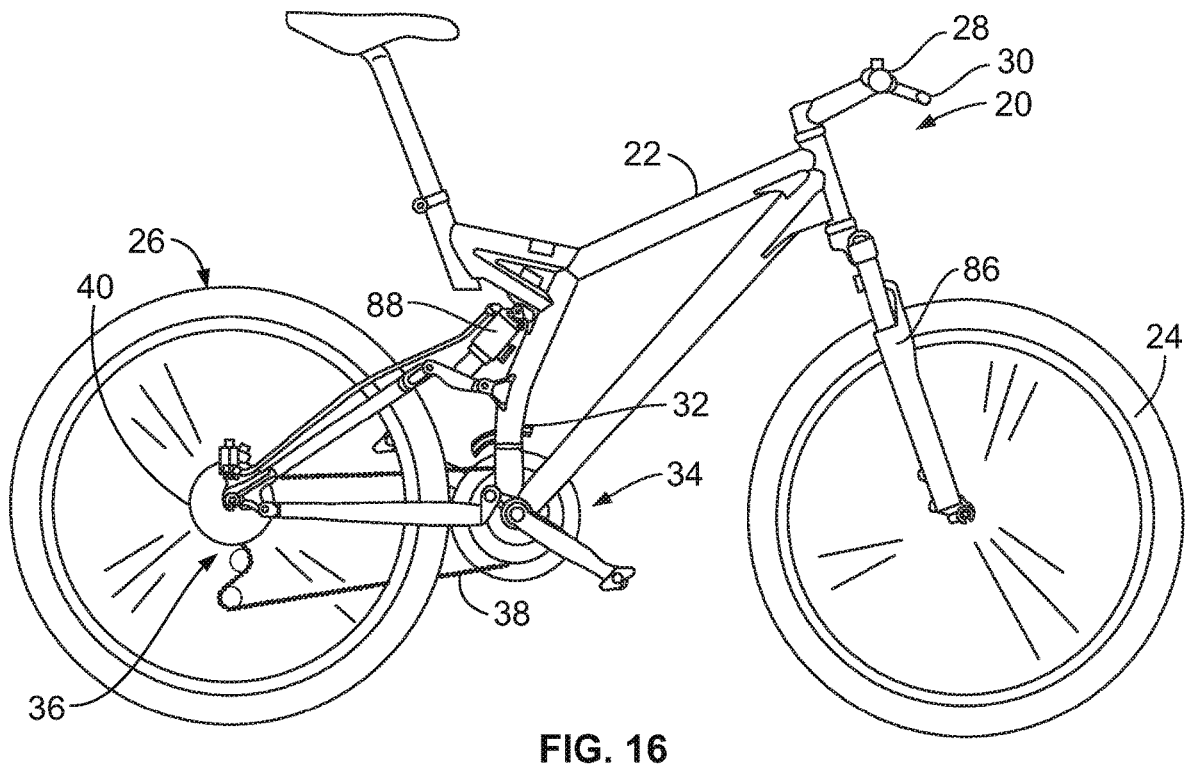
FIG. 16 is an example of a bicycle with front and rear suspension systems.

FIGS. 1 and 16 show a bicycle 20 having a frame 22 to which a front wheel 24 and a rear wheel 26 are attached in conventional positions. A handlebar 28 is attached near the front of the bicycle 20 and a pair of brake actuators 30 is attached to the handlebar. A front derailleur 32 may be attached to the frame 22 at or near a front crankset/chainring assembly 34. A rear derailleur 36 is attached to the frame 22 near the rear wheel 26. A chain 38 interconnects the front crankset/chainring arrangement 34 and a set of sprockets 40 disposed on and coupled to the rear wheel 26.

Figure 2:
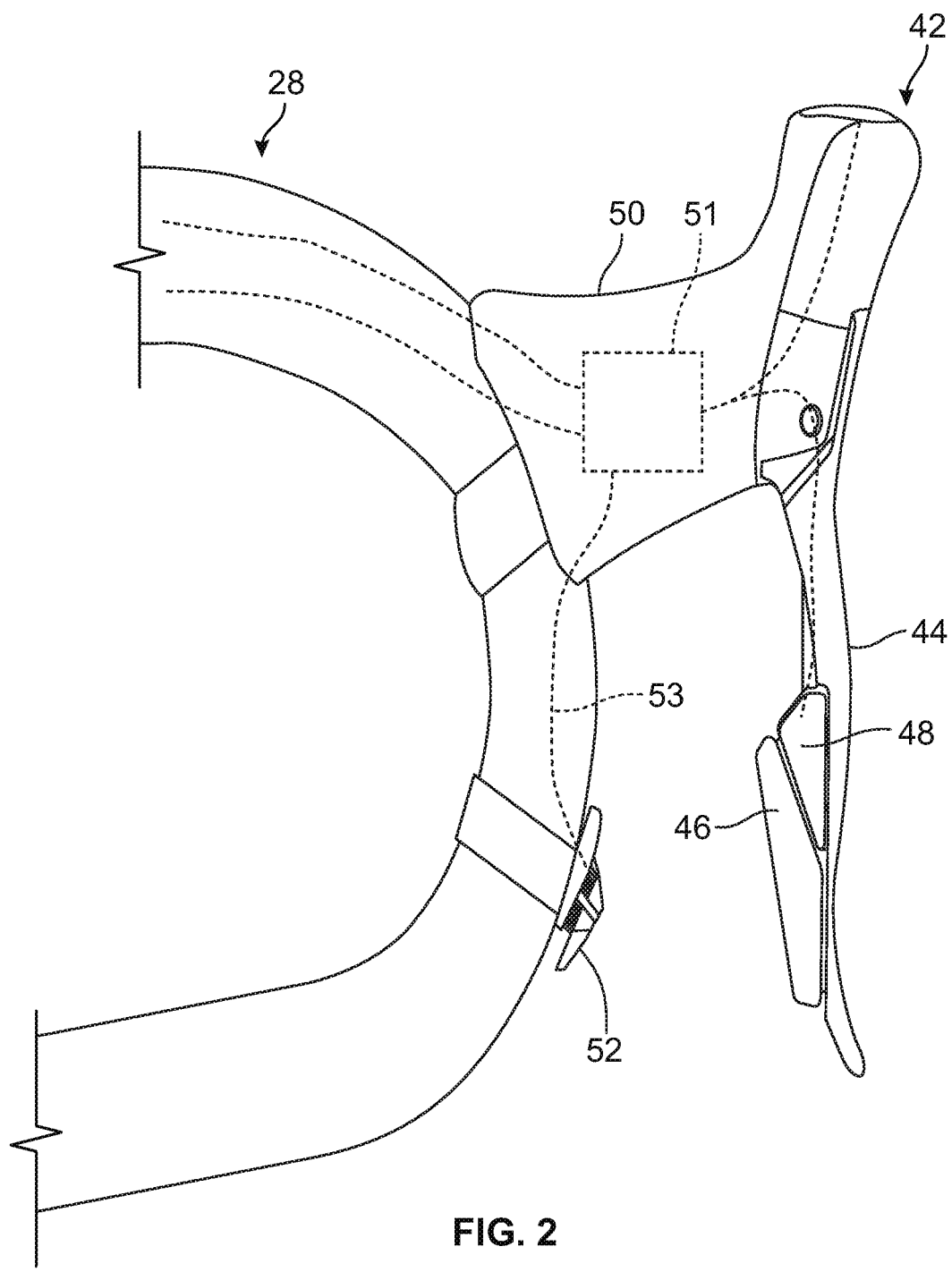
FIG. 2 is a prior art shift device with wired electronic controls hard mounted to a bicycle handlebar.

A prior art shifter 42 is shown in FIG. 2. The shifter 42 is an example of a prior art handlebar-mounted electronic shifter. Shifter 42 includes a brake lever 44 with shift buttons 46, 48 attached to the brake lever. The brake lever 44 is mounted to a housing portion 50 of the shifter 42 which in turn is mounted to the handlebar 28. If a rider wants to initiate a shift, the rider's hand must be located either on the housing portion 50 or the bar 28, just below the housing, in order to reach the shift buttons 46, 48. If the rider's hand is located elsewhere, the controls will be out of reach and the bicycle cannot be shifted.

FIG. 2 also shows a shift control switch 52 independent of the housing 50. This switch 52 may be clamped to the handlebar 28 and provides a separate location from which the rider can shift the derailleurs. However, in order to have a separate shift location, wires 53 must be run from the primary shift location, or alternatively, the secondary shift location must have a separate power source, processor, and wireless output means 51, independent of the first location. This greatly complicates setup as wires are typically placed under handlebar tape and increases the chance of wire and connector failure as the number of shift buttons increases.

Figure 3:
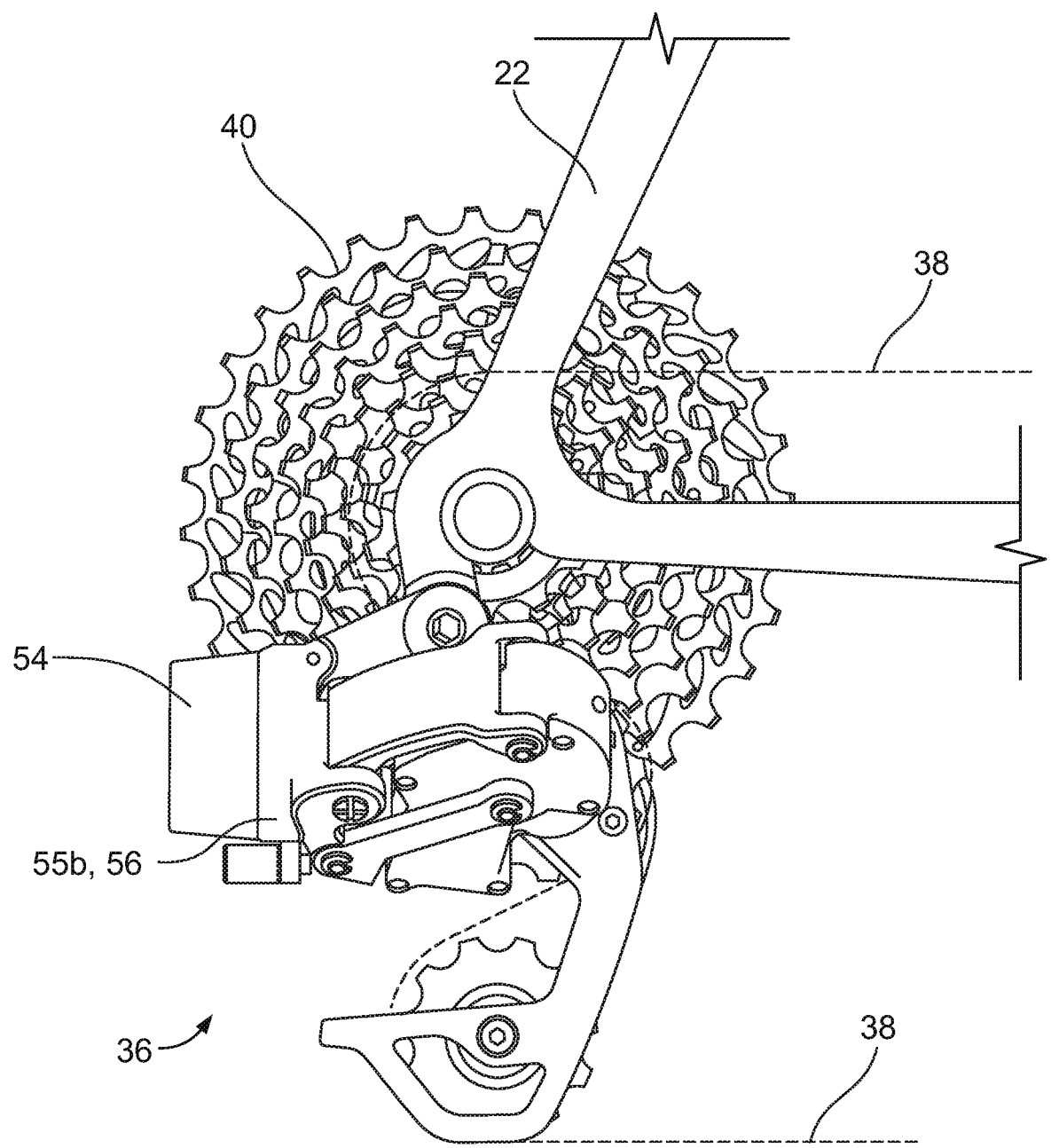
FIG. 3 is an embodiment of a wireless electromechanical rear derailleur.
Figure 4:
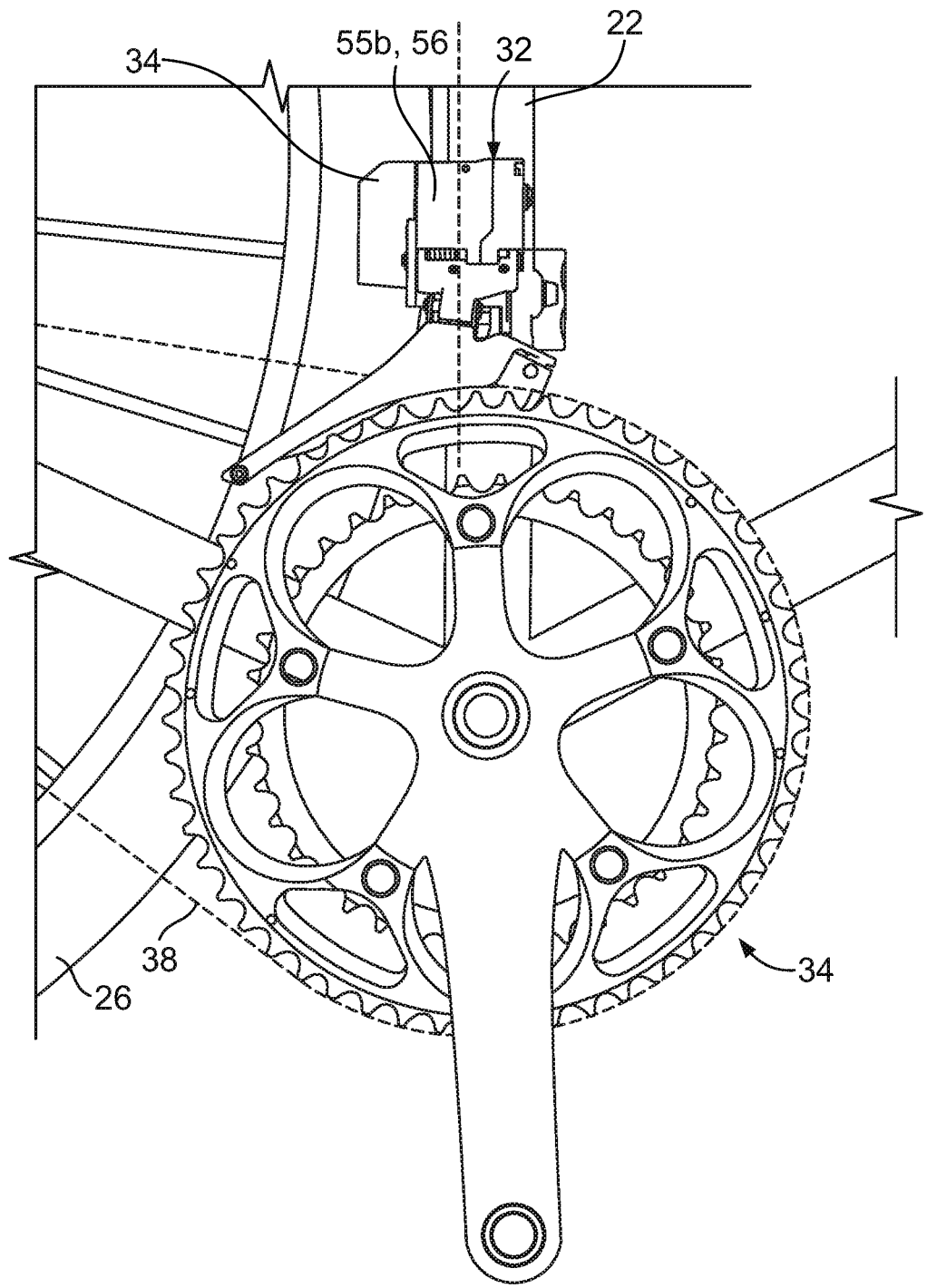
FIG. 4 is an embodiment of a wireless electromechanical front derailleur.

FIGS. 3 and 4 show examples of a wireless electromechanical front derailleur 32 and a wireless electromechanical rear derailleur 36. In these examples, the power source 54 for each derailleur device 32, 36 may be mounted directly to the device and may be in the form of a battery. Additionally, each device 32, 36 is provided with a wireless communication device 55B (which may include a receiver, a transmitter, or a combination of a receiver and transmitter) in communication with a CPU 56 to enable the devices to wirelessly communicate with a remote transmitter of a control device such as a shift control device (see FIG. 5) or a control device for operating a component or system of the bicycle that is not related to gear shifting, such as a bicycle suspension component or system. Each of the wireless electromechanical front derailleur 32 and a wireless electromechanical rear derailleur 36 is provided with an electric motor (not shown) for actuation thereof, as is well-known in the art. Referring to FIG. 16, each of the front and rear suspension systems 86, 88 will include a motor and wireless communication device like that in the above example, but adapted to operate suspension components of the suspension systems.

Signals transmitted by the control device may include those that indicate either an upshift or down shift (i.e., a type of control signal) for either the front or rear derailleurs 32, 36. The control signal may also be a change of state of the suspension system. The control signal may be transmitted to all derailleur devices 32, 36 or encoded to control one derailleur. Additionally, the transmission may be encrypted to prevent anyone but the transmitter of the signal from replicating or recording the signal thereby preventing others from controlling that particular device.

Figure 5:
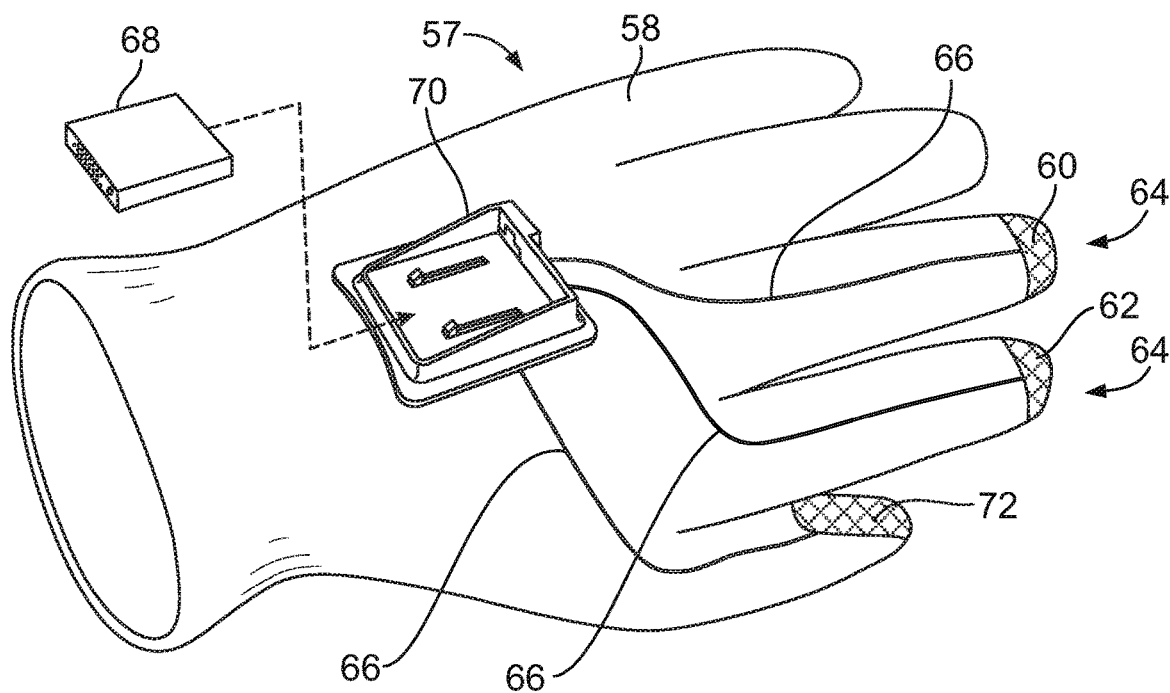
FIG. 5 is a glove with sensors disposed on or in the finger portions and removable electronics according to an embodiment of the invention.

FIG. 5 depicts a glove 58 supporting or serving as a substrate for the control device 57, which includes control sensors 60, 62 at the finger portions 64 of the glove. The control sensors 60, 62 are connected to integrated connections 66. The integrated connections 66 connect the sensors 60, 62 to a processor 69, (which may also be known as a control CPU or control processor), which is any suitable microprocessor capable of generating control signals responsive to input signals from the control sensors. A wireless transmitter 55A is connected to the processor 69 for transmitting the control signals. A power source 54 powers the processor 69 and transmitter 55A (see FIG. 7).

The processor 69, transmitter 55A and power source 54 of the control device 57 may be arranged in a combined form or provided on the glove 58 as separate components. The processor 69, transmitter 55A and power source 54 of the control device 57 may be collectively referred to as an electronic control unit 68 (ECU). The control device 57 may include an optional interface 70 by which the electronic control unit 68 can be removed from the glove, in one embodiment, without the use of tools.

Sensing actions performed by the user with the control device 57 can be accomplished by various means, as discussed below. The integrated connections 66 may be wires, conductive fabrics or any conductive material or compound running to specific points on each finger and connected to the ECU 68. As noted above, the electronic control unit 68 may include any combination of circuitry, a power source, transmitting and optional receiving devices and a processor (CPU), or the like, which is programmable with computer code to operate and control the unit for its intended use. Optionally, one of the glove 58 or ECU 68 may include some form of display or device to generate some feedback which may be visible or audible, for example (not shown).

The interface 70 may permit detachable mounting of the sensitive electronics (ECU 68), so that that glove can be washed, for example. Also the shift control sensors 60, 62 at the fingers of the glove 58 may be designed to be permanently attached to the glove or may also be removable to allow cleaning of the glove or to allow the sensors to be transferred from one glove to another. Additionally, the electronics may be separate from the riding glove 58 itself and be used as a liner, inside of a riding glove, a cover over a riding glove or a device attached directly to the rider's hand that connects the shift control sensors 60, 62 to the fingers and the ECU 68 to the hand, remote from the shift control sensors for use without a glove.

Figure 6:
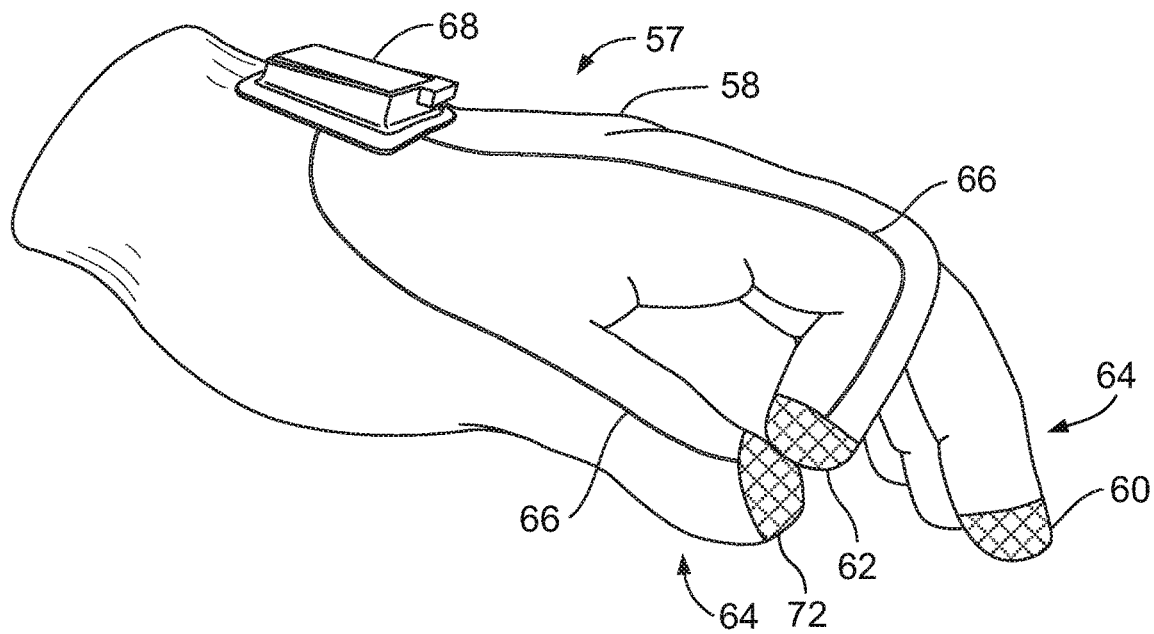
FIG. 6 is a side view of a glove with sensors where the index finger pad and thumb pad are in contact to actuate a shift circuit.

FIG. 6 shows control sensors 60, 62 and 72 arranged at the fingers 64 of a glove 58 according to an embodiment of the invention. In the illustrated example, the sensors 60, 62 and 72 may comprise conductive pads, each arranged at or near each finger portion 64 of the glove. Conductive wires 66 run from the pads to the ECU 68. When the rider brings two pads into contact, a circuit is closed or the state of the circuit is changed. In FIG. 6, the index finger and the thumb of the rider are touching. This particular contact combination might indicate that a rear derailleur 36 upshift is desired, and accordingly, will result in the generation and transmission of a control signal indicative thereof. Likewise, if the thumb and the middle finger are pressed together, this might indicate a desired a rear derailleur 36 downshift, and will result in the generation and transmission of a control signal indicative thereof.

Figure 7:
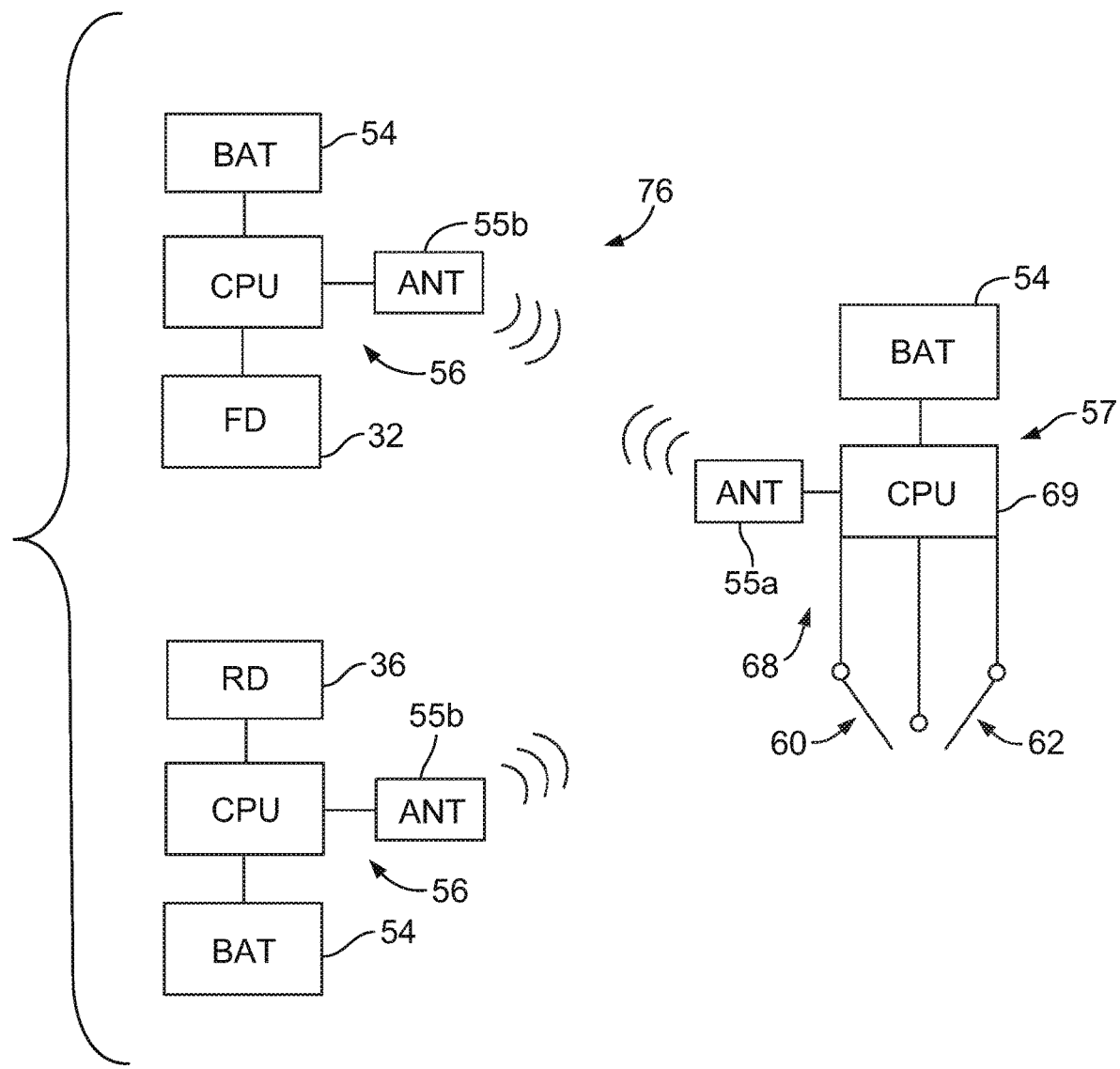
FIG. 7 is a schematic depicting open/closed circuit wireless hand-mounted shifting.

One embodiment of an electrical schematic of a wireless communication system 76 responsive to control inputs generated by the glove-mounted control device 57, is shown in FIG. 7. The systems (76, 176, 276) illustrated respectively in FIGS. 7, 11 and 13 each may include an electromechanical front derailleur 32 and an electromechanical rear derailleur 36, each derailleur including a respective power source 54, CPU 56 and wireless communication device having at least a derailleur wireless receiver 55B. Optionally, the derailleur(s) may be replaced by or provided in addition to one or more suspension components or systems. The ECU 68 includes a power source 54, shift control processor (CPU) 69 and wireless transmitter 55A.

In order to avoid unintended shifts, a specific contact time or pressure may be preset when sensors 60 and/or 62 are actuated. The shift control processor (CPU) 69 can then be programmed to ignore the closed circuit if it occurs for a time less than required or if an input signal occurs too close in time to a previous input signal. Alternatively, the resistance of the closed circuit can be measured and if the circuit is closed but the resistance is deemed to be too high, it can be presumed to be an unintended input signal. Thus, the shift control processor 69 may be programmed to reject unintended input signals.

Additionally, the system is not limited to shifting only a single device with a corresponding single control device 57, as depicted in FIG. 6. The control device 57 can be designed to have only one circuit and thus generate only one shift control signal. A right glove with a control device 57 might produce a rear derailleur 36 upshift signal and a left glove with a control device 57 might produce a rear derailleur 36 downshift signal. Meanwhile, a separate circuit disposed on either glove might control the shifting of the front derailleur 32, or alternatively, the front derailleur may be made to toggle from one gear position to the next by closing both circuits in both gloves at the same time.

Figure 8:
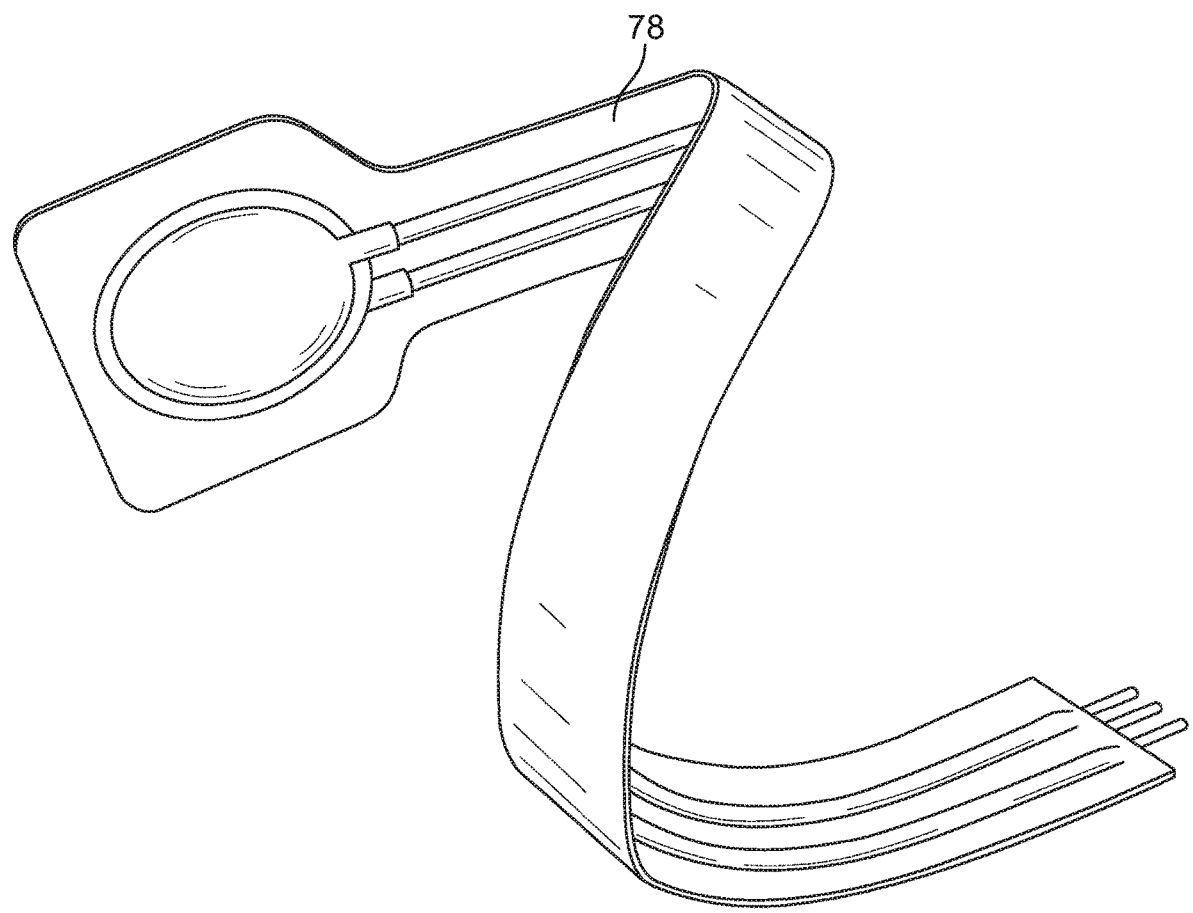
FIG. 8 is an example of a flexible pressure sensitive resistive sensor for positioning on a glove.
Figure 9:
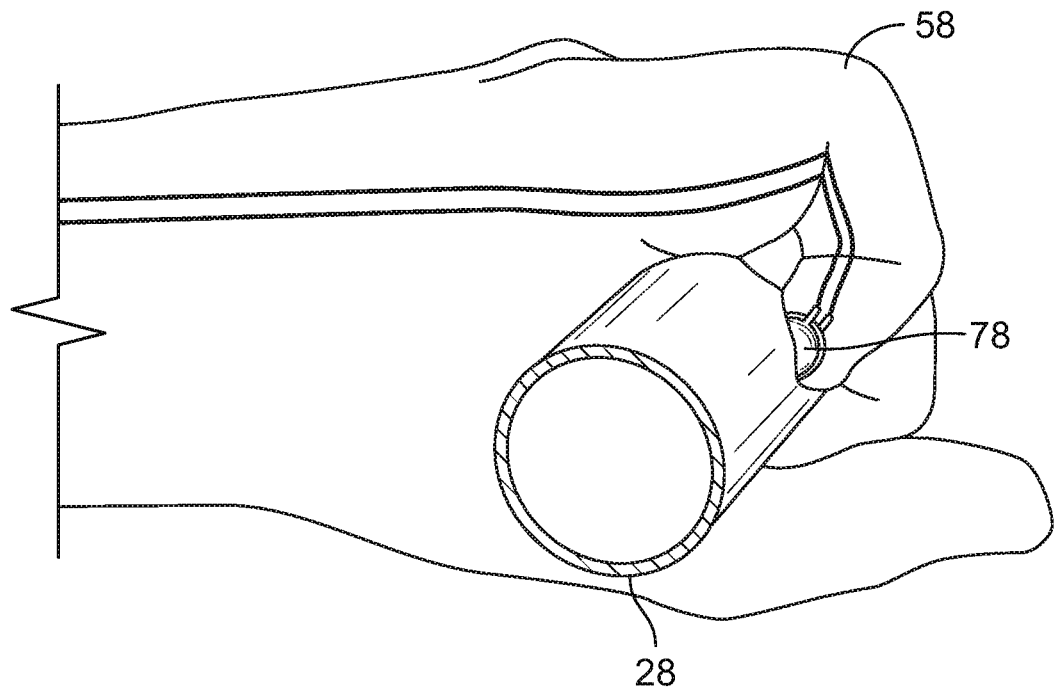
FIG. 9 is a pressure sensitive resistor actuable on the finger pad portion of the glove.
Figure 10:
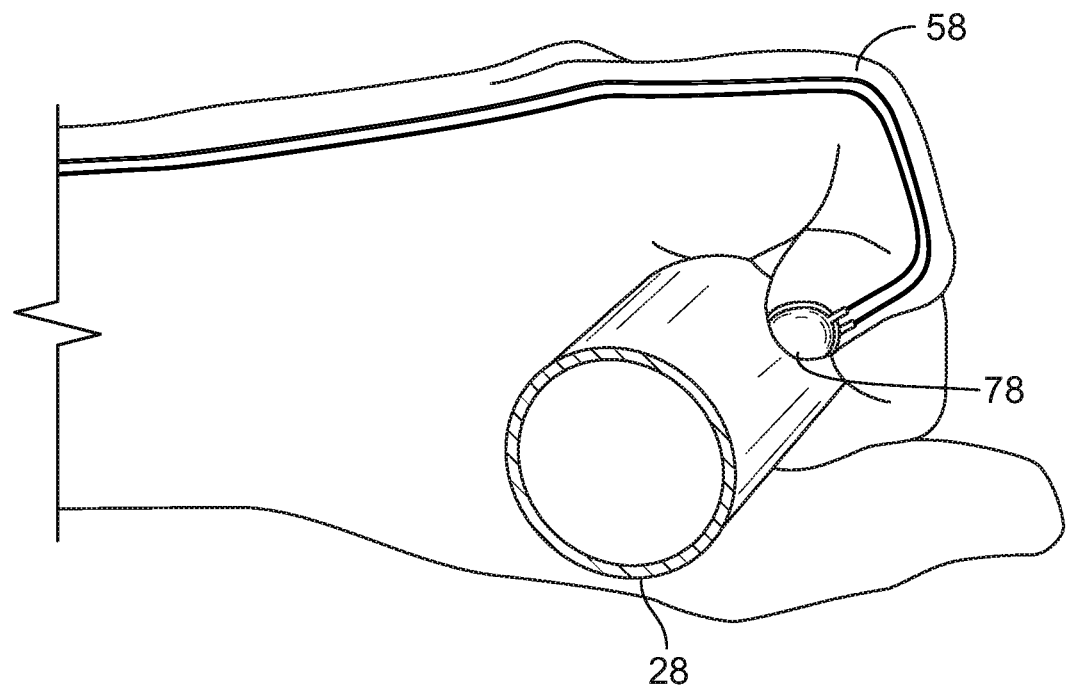
FIG. 10 is a pressure sensitive resistor actuable on the fingertip portion of the glove.
Figure 11:
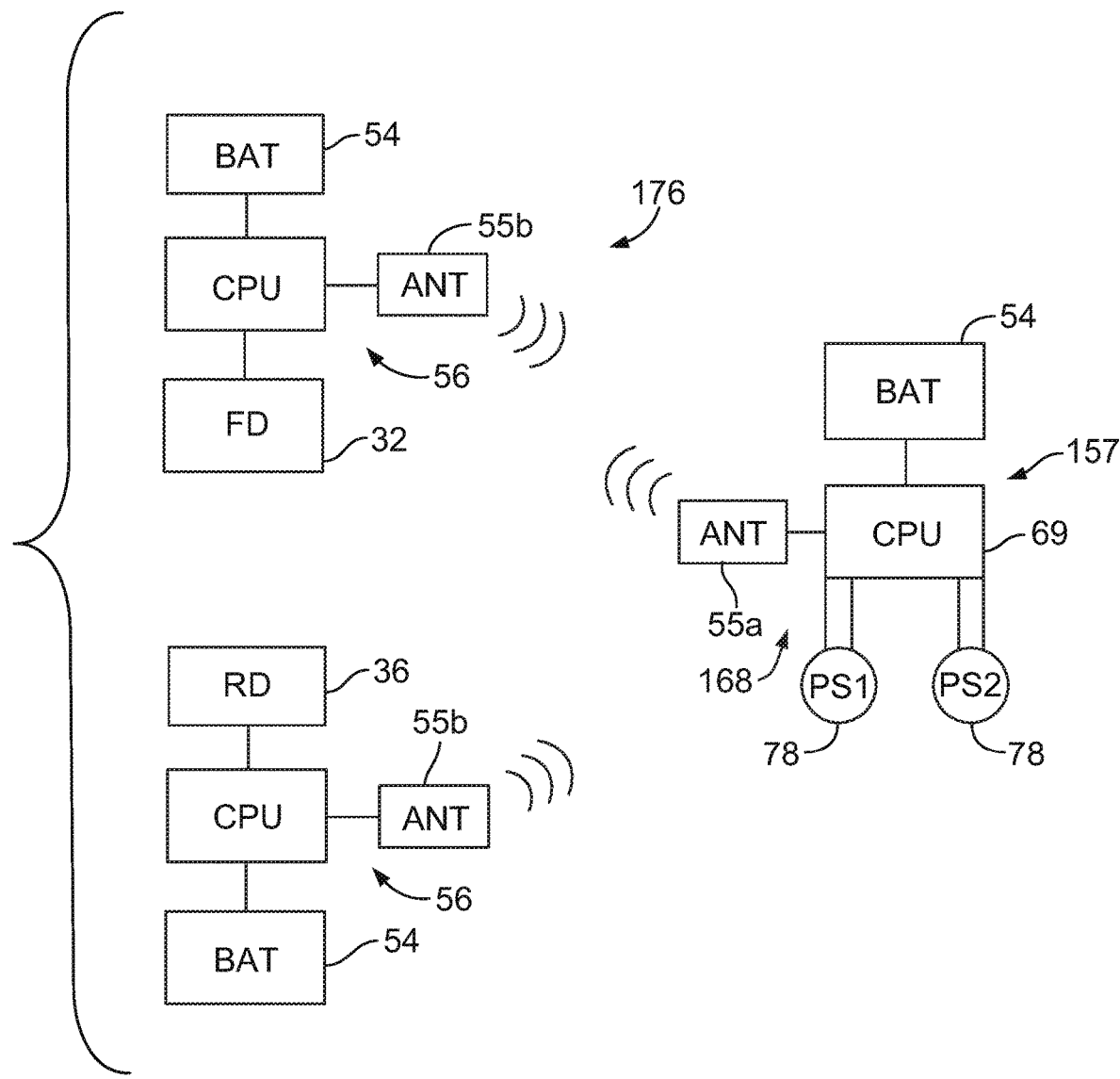
FIG. 11 is a schematic of a shifting system with pressure sensitive sensors in a wireless glove-mounted configuration.

FIG. 8 depicts an example of a shift control sensor in the form of a flexible pressure sensitive resistor 78, sold under the trade name Flex/Force® manufactured and sold by Tekscan. Flex/Force® is a piezo-resistive sensing device in which a resistance is inversely proportional to an applied force. This type of device may be integrated into the rider's glove 58 at either the finger pad area (FIG. 9) or the fingertip area (FIG. 10). A schematic of this system is shown in FIG. 11. This type of pressure-sensitive switch 78 is very thin and can be easily integrated into a glove without changing the shape or appearance of the glove. Also, there are no moving parts, as with a traditional switch.

FIG. 11 shows a shifting system 157 including a sensor 78 of the type described above. To operate the sensor 78, the shift control processor 69 creates a voltage across the sensor 78. When there is no pressure applied to the sensor 78, the sensed resistance is relatively high because the current passing through the sensor 78 is negligible. When a rider desires to shift the bicycle, the rider pushes down on the sensor 78. As the force or pressure on the device increases, the resistance decreases. With a decrease in resistance comes an increase in current. Once the current reaches a predetermined threshold, the shift control processor 69 determines that a shift is desired. The shift control processor 69 is programmed to ignore forces below the predetermined threshold, thus avoiding unintended shifts. Optionally, the derailleur(s) may be replaced or provided in addition to one or more suspension components or systems. In this case the shift control system(s) 157 would shift the state of the one or more suspension components or systems.

It is understood that the pressure sensitive switch 78 might be considered an improvement over individual mechanical switches. Nevertheless, designed correctly, a mechanical switch can yield many of the same benefits. Accordingly, the embodiments that include individual mechanical switches located discretely on the fingers of the rider's gloves are contemplated under the broader aspects of the invention. In FIGS. 9-11, the pressure sensitive switch 78 can be replaced with a mechanical switch allowing for changes in mechanical packaging and possibly other requirement of the switch.

Figure 12:
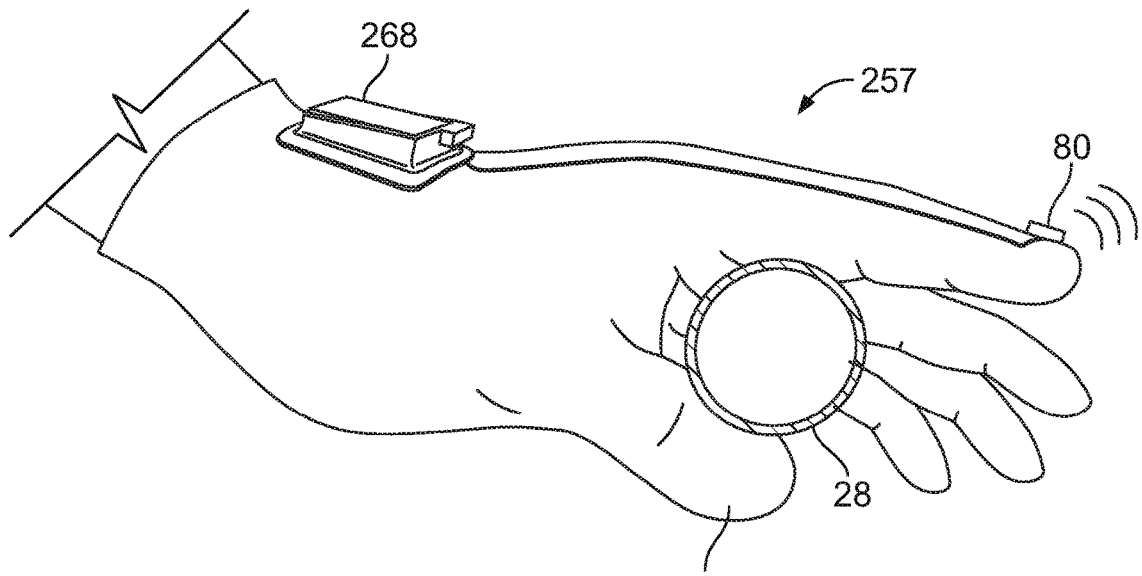
FIG. 12 is an accelerometer-based sensing arrangement on the back of a glove hand.

FIG. 12 depicts another embodiment of a control device 257 with shift control sensors in the form of accelerometers on a glove 58 connected to an ECU 268. Accelerometers are used to measure changes in acceleration and orientation, as commonly used in cell phones and video game controllers. One example of such a device is the ADXL330 low-power, 3 axis+/−3G mems accelerometer manufactured by Analog Devices. Such devices have many advantages as shift control sensors. They are low power, very durable and do not require contact with any other object to work. The sensor simply senses its relative position in space as a function of gravity and change of position as a function of acceleration. For example, the orientation of the device relative to the ground can be used to indicate a shift signal.

Figure 14A:
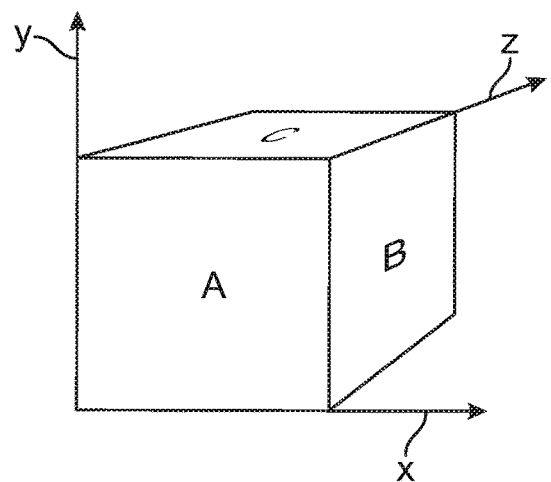
FIGS. 14A-C are schematics of an accelerometer orientation signal based on finger orientation.
Figure 14B:
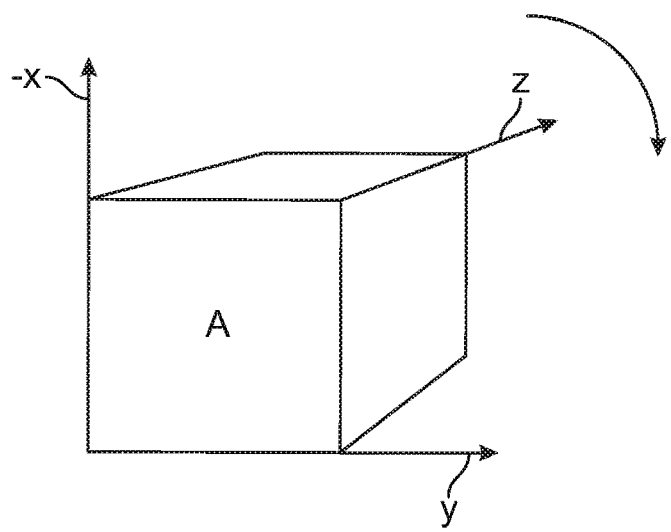
Figure 14C:
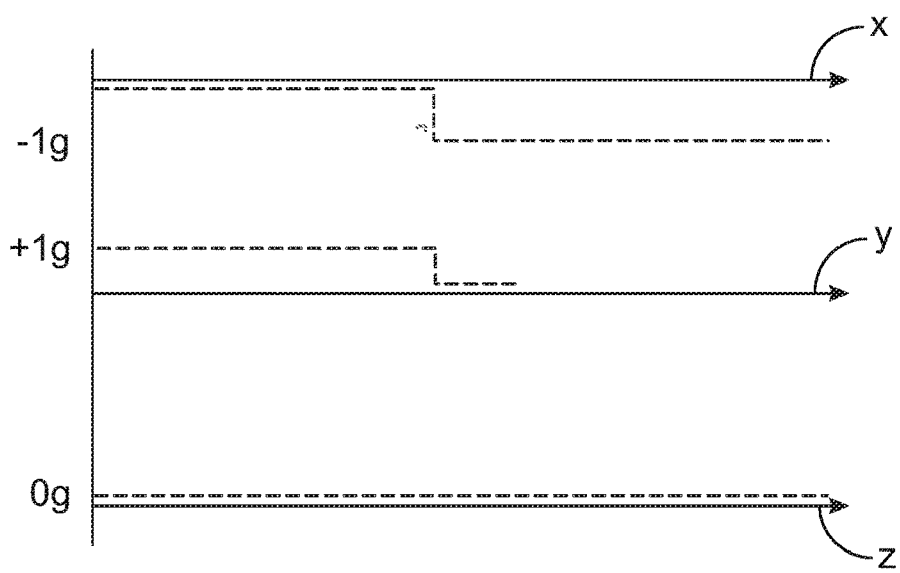

As shown in FIG. 12, the accelerometer 80 is mounted to the back of the index finger. When the index finger is raised to be horizontal with the ground, the sensor assumes an orientation where only one axis of the accelerometer 80 is subjected to the acceleration force of gravity. This is graphically shown in FIGS. 14A-C, wherein the value of acceleration measured by the X and Y axis are reversed as the orientation of the accelerometer 80 changes from a position that is substantially vertical to a position that is substantially horizontal.

An alternative use of the accelerometer 80 is to measure the acceleration imposed on it and set a threshold acceleration beyond which one can determine that a shift command is desired. This is similar to the pressure sensitive resistors discussed earlier. Normal riding activity imparts forces on the rider's hands from the bicycle when traveling over road irregularities as well as normal contact forces with the bars during riding. The CPU 69 may be programmed to only recognize accelerations above a predetermined value as an intended shift signal, thereby allowing the rider to generate this value by tapping a finger on the bar itself with sufficient force. The rapid deceleration of the rider's finger upon contacting the bar would be higher than the forces stemming from the road as these road-induced forces are dampened by the air in the tires and the flexibility of the wheels, frame, stem and bars.

Figure 13:
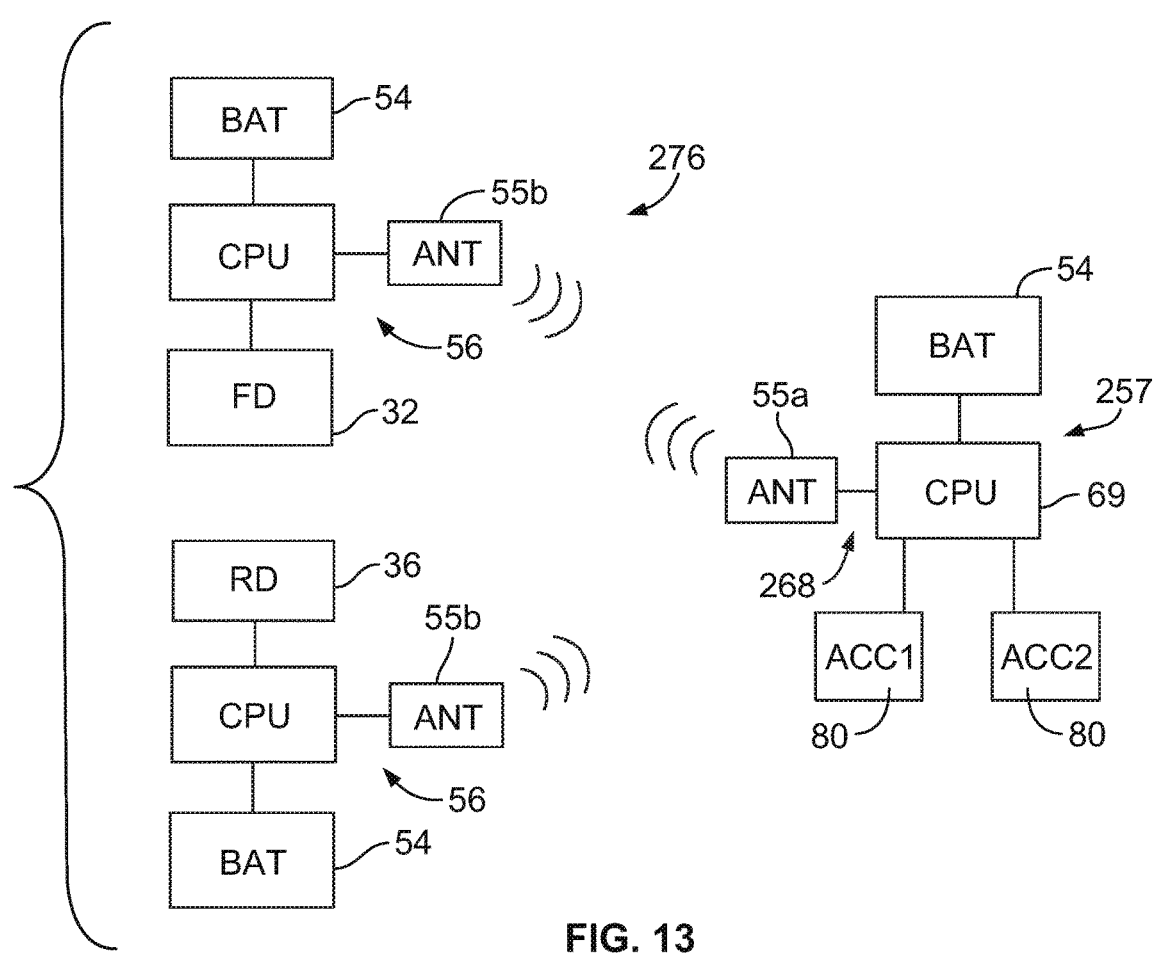
FIG. 13 is a schematic of accelerometer sensor wireless glove-mounted shifting system.

FIG. 13 depicts yet another embodiment of a wireless communication system 276 including a front derailleur 32 and a rear derailleur 36, each including a respective power source 54, CPU 56 and wireless communication device 55B. The shift control device 257 includes an ECU 268 and accelerometer sensors 80 connected thereto. The ECU 268 is in wireless communication with the derailleurs 32, 36, as in the above examples.

Figure 15:
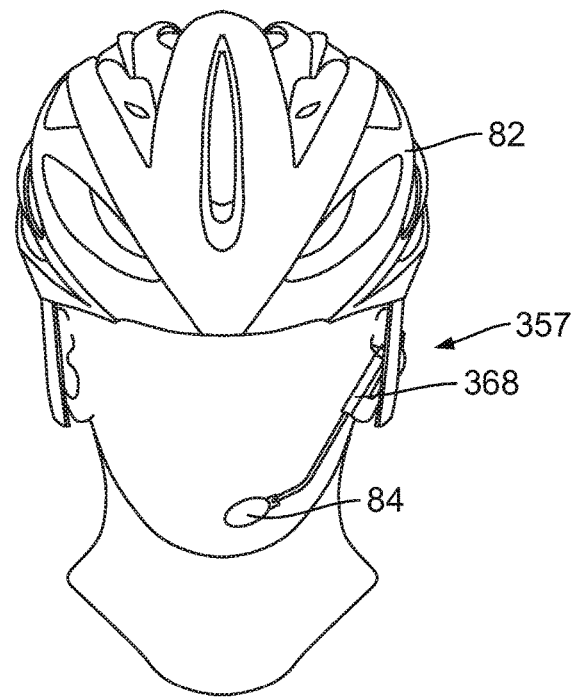
FIG. 15 is a depiction of a rider wearing a helmet to which an auditory sensing arrangement is attached.

FIG. 15 depicts yet another embodiment of a wireless control device 357, which may be worn on a rider's helmet 82. In this embodiment, the sensor is a microphone 84 or the like. The helmet also may carry an ECU 368, which may include the same components as in the above examples. In particular, the ECU 368 may include a power source, a wireless transmitter, and a control processor as detailed above. The control processor of the ECU 368 is configured to receive input signals (generated by voice commands) from the microphone 84 and analyze the input signals with well-known voice recognition software. The control processor 369 may be configured to generate control signals for controlling one or more of a bicycle gear shifting component or system, a suspension component or system or any other controllable components or systems of the bicycle.

FIG. 16 shows a bicycle that, in addition to the above components, has a front suspension system 86 and an optional rear suspension system 88. Each of the front and rear suspensions 86, 88 will include a motor (not shown) for operating one or more parameters of the system, and electronic componentry for operating the motor. It will be understood that the particulars of the motor and electronic componentry will be adapted in configuration to the intended application, be it a gear changing device, a suspension device and so on.

In use, and by way of example, in an embodiment where the wireless control device 357 is used to control a rear suspension component or system 88, the control device may be programmed to respond to commands corresponding to 1) lockout, 2) pedal, and 3) open settings of the suspension. In an embodiment where the wireless control device 357 is used to control a front suspension component or system 86, the control device may be programmed to respond to commands corresponding to 1) lockout, 2) pedal, and 3) open settings of the suspension. The control device 357 could control both the front and rear suspension components 86, 88 separately or collectively, wherein a single lockout voice command could change both front and rear suspensions to a lockout setting simultaneously, for example. In the alternative, the control device 357 could be programmed to control the front and rear suspensions 86, 88 separately.

In an embodiment where the wireless control device 357 is used to control a wirelessly controllable rear derailleur or rear gear changer component or system, the control device may be programmed to respond to commands corresponding to "up" or "down," "harder" or easier," or "one, two, three, four" and so on, for example, to change the gear position of the bicycle in single increments. The control device 357 could also generate a shift command to cause a shift of more than one gear position in response to a single command. For example, the rider could say, "two-up" or "two-down" to change two gear positions up or down. The rider could say, "all-up" or "all-down" to shift the gear changer to one of the extreme gear positions in one single operation. The control device 357 according to the present embodiment could exhibit a broad range of flexibility and programmability if responsive to voice commands. In a similar fashion, the control device 357 could be used to control a wirelessly controllable front derailleur.

In a similar fashion, the control device 357 could also be programmed to control other systems (not shown) of the bicycle, such as lights, electrical generators, and other systems such as heart rate monitors, GPS units, power meters, and speedometers, for example, and the computerized units that collect, analyze and display data related to the bicycle systems.

In these embodiments, the rider's hands exercise individual control of one or more derailleurs in a way that does not require that the control devices be connected to the bike.

While this invention has been described by reference to particular embodiments, it should be understood that numerous changes could be made within the spirit and scope of the inventive concepts described. Accordingly, it is intended that the invention not be limited to the disclosed embodiment but that it have the full scope permitted by the language of the following claims.

I claim:

1. A control device wearable by a bicycle rider, the control device comprising:
   at least one wearable control sensor generating input signals when actuated;
   a shift control processor in communication with the at least one control sensor generating control signals responsive to the input signals;
   a wireless transmitter transmitting the control signals; and
   a power source connected to the shift control processor and the wireless transmitter.

2. The control device of claim 1, wherein the control sensor is a shift control sensor.

3. The control device of claim 2, wherein the control device is configured to be mountable to hands of the bicycle rider.

4. The control device of claim 2, wherein the at least one shift control sensor includes two or more sensors.

5. The control device of claim 2, wherein the at least one shift control sensor is one or more of a pressure sensor, an optical sensor, a switch, an accelerometer, and a microphone.

6. The control device of claim 2, further comprising:
   at least one wearable glove to which the at least one shift control sensor is mounted.

7. The control device of claim 6, wherein the at least one shift control sensor is mounted on the glove in a position at or near a tip of the glove.

8. The control device of claim 6, wherein one or more of the shift control processor, the wireless transmitter, and the power source are removably disposed on the glove.

9. The control device of claim 8, further comprising:
   a receptacle on the glove in electrical communication with the at least one shift control sensor enabling tool-less removable coupling of the shift control processor, the wireless transmitter, and the power source to the glove.

10. The control device of claim 6, wherein the at least one glove is a pair of gloves, each of the pair of gloves including at least one shift control sensor.

11. The control device of claim 10, wherein each of the pair of gloves includes two or more shift control sensors.

12. A shifting system for a bicycle, comprising:
a shift control device, comprising:
at least one wearable shift control sensor to generate input signals when actuated;
a shift control processor in communication with the at least one shift control sensor generating control signals responsive to the input signals;
a wireless transmitter transmitting the control signals; and
a power source connected to the shift control processor and the wireless transmitter; and
an electromechanical rear derailleur including a rear derailleur wireless receiver receiving the control signals, a rear derailleur motor responsive to the received control signals, and a rear derailleur power source connected to the rear derailleur wireless receiver and the rear derailleur motor.

13. The shifting system of claim 12, further comprising an electromechanical front derailleur including a front derailleur wireless receiver receiving the control signals, a front derailleur motor responsive to the received control signals, and a front derailleur power source connected to the front derailleur wireless receiver and front derailleur motor.

14. The shift control device of claim 12, wherein the at least one shift control sensor includes two or more sensors.

15. The shift control device of claim 12, wherein the at least one shift control sensor is one or more of a pressure sensor, an optical sensor, a switch, an accelerometer, and a microphone.

16. The shift control device of claim 12, further comprising:
at least one wearable glove to which the at least one shift control sensor is mounted.

17. The shift control device of claim 16, wherein the at least one shift control sensor is mounted on the glove in a position at or near a tip of the glove.

18. The shift control device of claim 16, wherein the shift control processor, the wireless transmitter, and the power source are removably disposed on the glove.

19. The shift control device of claim 18, further comprising:
a receptacle on the glove in electrical communication with the at least one shift control sensor which enables tool-less removable coupling of the shift control processor, the wireless transmitter, and the power source to the glove.

20. The shift control device of claim 16, wherein at least one glove is a pair of gloves, each of the pair of gloves including at least one shift control sensor.

* * * * *